United States Patent
Stein et al.

[11] Patent Number: 5,925,191
[45] Date of Patent: Jul. 20, 1999

[54] FERRULE CLEANING ROD AND METHOD OF USE

[76] Inventors: Harold M. Stein, 144 Beekman Dr., Agawam, Mass. 01001; David J. Stein, 11 Ramah St., Springfield, Mass. 01104

[21] Appl. No.: 08/854,232

[22] Filed: May 9, 1997

Related U.S. Application Data

[60] Provisional application No. 60/017,286, May 13, 1996.

[51] Int. Cl.⁶ .................................. B08B 7/00
[52] U.S. Cl. .................... 134/6; 15/104.001; 15/104.04; 15/104.05; 15/244.1; 15/244.4; 451/557; 385/85
[58] Field of Search ................ 15/104.061, 3.5, 15/244.1, 104.001, 104.05, 104.04, 104.09, 104.03, 118, 211, 244.4; 451/557, 558, 552, 523, 41; 385/85; 134/6, 9

[56] References Cited

U.S. PATENT DOCUMENTS

| | | | |
|---|---|---|---|
| 1,796,338 | 3/1931 | Moore | 15/3.5 |
| 1,939,612 | 12/1933 | Rose | 15/244.1 |
| 2,218,738 | 10/1940 | Boysen | 15/244.1 |
| 2,318,365 | 5/1943 | Boysen | 15/244.4 |
| 3,118,163 | 1/1964 | Abberly | 15/244.1 |
| 3,319,281 | 5/1967 | Montgomery | 15/244.1 |
| 3,694,845 | 10/1972 | Engelsher | 15/244.4 |
| 3,998,012 | 12/1976 | Ness | 451/523 |
| 4,263,692 | 4/1981 | Gremillier | 15/104.04 |
| 4,785,586 | 11/1988 | Kratfel | 451/55 |
| 5,325,452 | 6/1994 | Stein et al. | 385/67 |
| 5,557,696 | 9/1996 | Stein | 385/67 |
| 5,573,015 | 11/1996 | Williams | 128/864 |
| 5,761,758 | 6/1998 | Mellon | 158/104.01 |

*Primary Examiner*—Gary K. Graham
*Attorney, Agent, or Firm*—Donald S. Holland, Esq.; Holland & Bonzagni, P.C.

[57] ABSTRACT

Various embodiments of a rod for cleaning and/or polishing embodiments of a ferrule in a fiber optic connector are disclosed. In a first embodiment, the rod is formed of an ultra high molecular weight polyethylene hydrophobic material, preferably absorbent. Each end of the rod has a hole that is a tight fit to the diameter of a male-type ferrule and is at least as deep as the length of the ferrule. The rod material is strong and pliable, so that after it is slipped over the male-type ferrule the rod can be rotated for cleaning the sides of the ferrule while being withdrawn from its snug fit with the ferrule. The holes may have polishing inserts formed therein. Alternatively, the rod has a male protrusion on one end. The male end inserts into the recess formed by the connector adaptor when using a female-type ferrule. The rod is then rotated to effect cleaning and/or polishing of the end face of the optical fiber together with cleaning of the insides surfaces of the side walls of the connector adaptor.

15 Claims, 2 Drawing Sheets

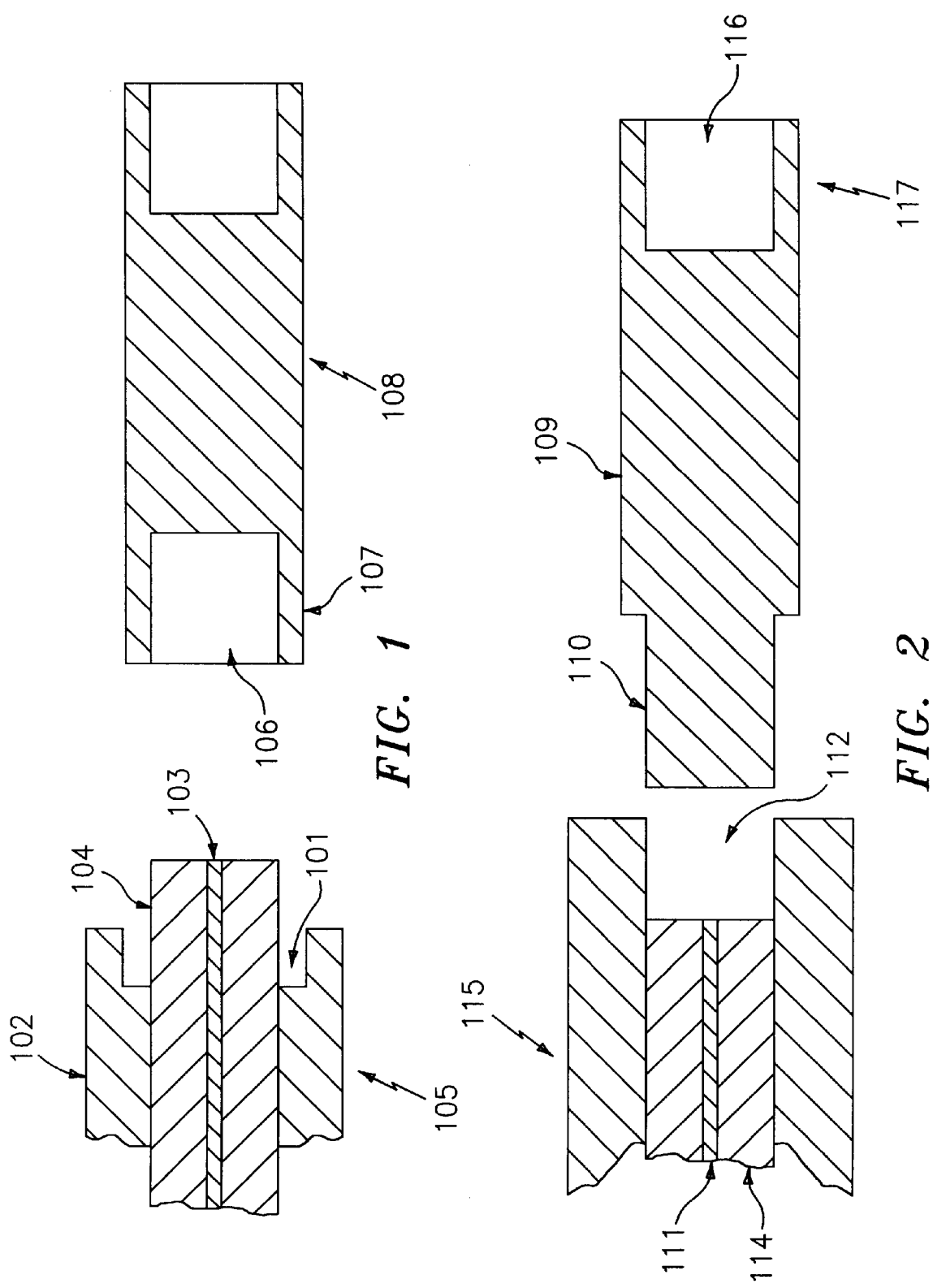

FERRULE CLEANING ROD AND METHOD OF USE

RELATED APPLICATION

This application is based in part on Provisional Patent Application Ser. No. 60/017,286, filed May 13, 1996.

BACKGROUND OF THE INVENTION

This invention relates to fiber optic connectors, and more particularly to a device, in the nature of a hand-held rod, for both cleaning and/or polishing the sides and end face of a ferrule of a fiber optic connector and the corresponding end face of an optical fiber contained within the ferrule.

A fiber optic connector typically includes a cylindrical ferrule which confines the transmission glass portions of a fiber optic cable. The ferrule represents a termination point, or one end, of the fiber optic cable. The ferrule typically comprises ceramic, zirconia or polymer material, or a suitable metal, such as stainless steel. Generally, the ferrule is mounted to the end of the fiber optic cable by first removing, or "peeling back", a portion of the outermost structure of the fiber optic cable. The "outermost structure" is that part of the cable which surrounds and protects the innermost optical core and cladding glass material (hereinafter together referred to as "the optical fiber") during normal usage. A typical diameter for the optical core glass is eight microns, while a typical diameter for the optical cladding glass, concentrically surrounding the core glass, is 125 microns. On the other hand, the overall diameter for the cable outermost structure in one commercially-available embodiment is 4.5 mm.

The outermost structure may comprise several outer concentric layers, including a silicone coating surrounding the glass cladding, followed by a buffer jacket. Next may be a concentric layer of strength members, followed by an outer polyurethane jacket.

Optical signals are propagated through the optical fiber during information transfer. A plurality of separate fiber optic cables may be connected together, as part of a large communications network. The cables transmit voice, video and other types of data, in the nature of electromagnetic light wave signals, between various electronic devices. Fiber optic cables are generally terminated at interfaces with other fiber optic cables at splices or at pieces of electronic signal amplifying or "booster" equipment. Alternatively, fiber optic cables may terminate at an interface with light transmitting and/or receiving devices.

The termination or end face of the ferrule also generally includes the termination or end face of the optical fiber, usually both in the same plane. The ferrule of one connector is typically aligned and mated with the ferrule of another connector at a junction point, thereby aligning the optical fibers within both ferrules.

In the art of fiber optic connectors, such connectors are generally arranged structurally such that there are at least two types of relationships of ferrules with respect to an associated connector adaptor. A first "male" type has the end point of the ferrule protruding beyond or equal to the corresponding end point of the connector adaptor, and the ferrule also forms a crevice or air space between the outer surface of the ferrule and the inner surface of the connector adaptor. A second "female" type has the end point of the outer connector adaptor protruding beyond the corresponding end point of the ferrule, such that the end face of the ferrule is in a recessed position with respect to the connector adaptor.

For relatively maximum optical signal transfer between two mated or adjacent optical fibers, it is extremely important to keep the connector and all its components clean, especially the ferrule end face and side. It is particularly important to keep contamination off the ferrule end face where the exposed end of the optical fiber is located. Any contamination (e.g., fine dust or dirt particles, grease) at this critical interface point interferes with the propagation of light energy out of one optical fiber end and into another. Although the sides of the male-type ferrule do not touch the optical fiber, contaminants from the sides and the recesses of the connector adaptor and housing could ultimately gravitate to the optical fiber end face and cause interference or loss in coupling of optical energy between adjacent optical fibers. Thus, it is important to keep contamination off the sides of a male-type ferrule as well as off the end face. Also, for female-type ferrules, contaminants could ultimately gravitate from the inside surfaces of the connector adaptor over to the optical fiber end face.

Prior art ferrule cleaning devices consist of a multitude of wipes, air sprays and cleaning fluids. However, none of these specifically address cleaning of the side of the ferrule. Also, they do not reach down into the crevices of the adaptor, nor do they wipe, with any degree of consistency, the complete ferrule side and the crevices all at once. A further problem is that, in many types of connectors, the ferrule is permanently embedded in an assembly, cannot be removed and is not easily accessible; one example is the plug assembly of the SC connector produced by Siecor Corp. of Hickory, N.C. Therefore, known prior art ferrule cleaning devices are inadequate for cleaning the sides of a male-type ferrule.

Accordingly, it is a primary object of the present invention to provide a simple, hand-held device, in the nature of a rod, that cleans the sides of the male-type ferrule, down to the base of the ferrule located in the housing of a fiber optic connector.

It is a general object of the present invention to completely clean the sides and end face of a male-type ferrule to significantly reduce, or even eliminate, the possibility of any contaminants migrating from the sides of the ferrule onto the end face of both the ferrule and the optical fiber to thereby degrade or impede signal transmission into or out of the optical fiber.

It is another object of the present invention to provide a device for cleaning the sides of a male-type ferrule and the crevice created by the juncture of the ferrule and the connector adaptor used with single and multiple fiber optic connectors, wherein the ferrule is exposed or encased in various connector adaptors or sleeves.

It is another object of the present invention to provide a device for cleaning and/or polishing the end face of a female-type ferrule and the corresponding end face of an optical fiber within the ferrule.

Still another object of the present invention is to provide a device for cleaning and/or polishing the end face and sides of a male-type ferrule and the end face of an optical fiber.

The above and other objects and advantages of the present invention will become more readily apparent when the following description is read in conjunction with the accompanying drawings.

SUMMARY OF THE INVENTION

To overcome the deficiencies of the prior art and to achieve the objects listed above, the applicants have invented various embodiments of a device, in the nature of a rod, for cleaning and/or polishing a ferrule of a fiber optic connector together with the end face of an optical fiber located within the ferrule.

In a preferred exemplary embodiment of the present invention, the device consists of a round or cylindrical pliable plastic rod made of ultra high molecular weight polyethylene ("UHMWPE") hydrophobic, or other suitable material, preferably absorbent, which is formed so that each end of the rod has a hole that is a tight fit to the ferrule diameter and is at least as deep as the length of the ferrule. The material is sufficiently strong and pliable so that after it is slipped over the male-type ferrule the rod can be rotated while being withdrawn. The material is pliable and elastic so that it coils tightly around the ferrule as it is removed. A given density of UHMWPE or other materials with the similar chemical and physical properties serve this purpose very well.

In an alternative of this preferred embodiment, the rod has a male protrusion, instead of a hole, formed on one end of the rod. The male end of the rod inserts into the recess formed by the connector adaptor when using a female-type ferrule. The rod is then rotated to effect cleaning and/or polishing of the end face of the optical fiber together with cleaning of the insides surfaces of the side walls of the connector adaptor.

In another alternative of this preferred embodiment, the holes formed in the rod may have various types of polishing inserts formed integral with the rod or set in place within the hole of the rod. The polishing inserts may be such as to simultaneously cause polishing of the end face of both the ferrule and the optical fiber, together with cleaning, and perhaps polishing, of the sides of the ferrule.

BRIEF DESCRIPTION OF THE DRAWING

FIG. 1 is a cross-sectional view of an assembly of a fiber optic connector adaptor housing, male-type ferrule and optical fiber, together with a first embodiment of the rod of the present invention shown physically separated from the assembly for clarity;

FIG. 2 is a cross-sectional view of an alternative assembly of a fiber optic connector adaptor housing, female-type ferrule and optical fiber, together with a second embodiment of the rod of the present invention shown physically separated from the assembly or clarity

DETAILED DESCRIPTION OF THE PREFERRED EMBODIMENTS

Figure 3:
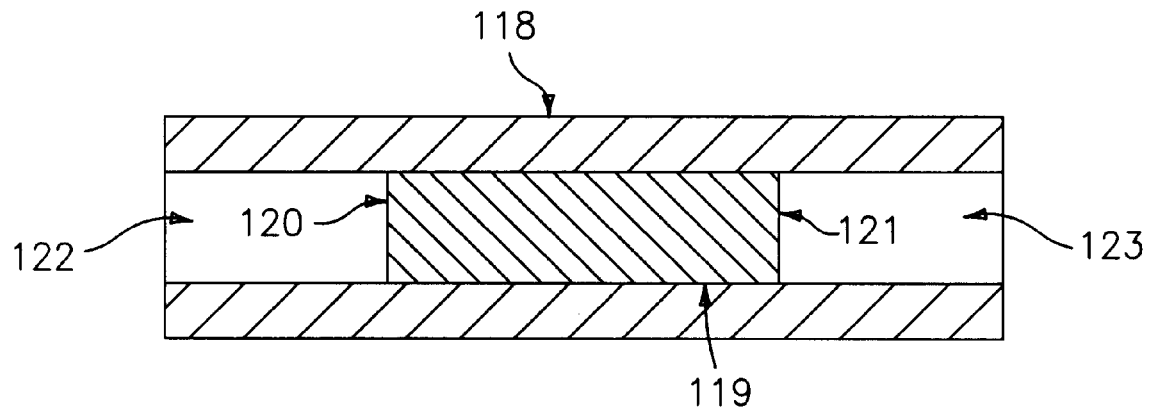
FIG. 3 is a cross-sectional view of an alternative embodiment of the rod of FIG. 1.

Referring to the drawings in detail, various preferred exemplary embodiments of a rod for cleaning and/or polishing both the sides and end face of a male-type ferrule, as well as the end face of a female-type ferrule, are illustrated therein. Specifically, with respect to a first embodiment of FIG. 1, the rod 108 is preferably made from UHMWPE hydrophobic, or other suitable material, preferably porous. Each end of the rod 108 has a hole 106 formed therein to close tolerance using various standard manufacturing techniques. In FIG. 1, each hole 106 is essentially identical. However, this is purely exemplary; the rod 108 may only have one hole 106 formed therein. Also, the rod does not have to be of a linear shape; instead, it can be any shape such as one incorporating a curve. Further, if the rod 108 has more than one hole 106, each hole may have different size characteristics (e.g., diameter, depth) that correspond to different size ferrules. It suffices for the broadest scope of this aspect of the present invention that the rod 108 have at least one hole formed therein.

Formation of the holes 106 results in a thin wall 107 in the rod material capable of fitting into the crevice 101 formed by the juncture of the male-type ferrule 104 and the body of the connector adaptor 102. Reference numeral 105 designates a typical assembly of a connector adaptor 102 and ferrule 104, with an optical fiber strand 103 disposed within the ferrule 104 and having an exposed end face proximate the end face of the ferrule and typically in the same plane. The end face of the ferrule 104 extends beyond the ends of the connector adaptor 102.

The holes 106 in the rod 108 are sized to have a tight fit to the diameter of the male-type ferrule 104. Typically, such male-type ferrules have diametrical sizes that are similar across various manufacturers. The holes 106 are preferably at least as deep as the length of the ferrule 104. In this way the end face of each hole 106 comes in contact with both the end face of the ferrule 104 and the end face of the optical fiber strand 103, and the entire crevice 101 can be cleaned. The rod material must be sufficiently strong and pliable so that after it is slipped over the ferrule 104 it can be rotated while being withdrawn to effect a thorough cleaning. The material is pliable and elastic so that it coils tightly around the ferrule 104 as it is removed. A given density of UHMWPE or other materials with the similar chemical and physical properties serve this purpose very well. Materials such as porous UHMWPE are excellent for removing dirt and grease. A single rod 108 can also be reused many times to clean ferrules 104 before it must be discarded.

Cleaning of the sides of the ferrule 104, the crevice 101, and the end face of the ferrule 104 and the exposed face of the optical fiber 103 is simple and is accomplished by first slipping the rod 108 over the ferrule 104. The porous nature of the rod 108 absorbs any contamination from these areas. The rod 108 is then withdrawn away from the ferrule 104 with a slight twist and the cleaning of both the side and end face of the ferrule 104 and end face of the fiber 103 is complete. The cleaning (and any polishing accomplished by the rod 108) may be carried out with the rod rotating either eccentric or concentric to the optical fiber 103 within the ferrule 104. A means and method for eccentric cleaning of an optical fiber is described and claimed in U.S. Pat. Nos. 5,325,452 and 5,557,696, both of which are incorporated herein by reference.

The rod 108 of the present invention has a number of advantages over prior art cleaning methods and devices, including the fact that the rod is a tight fit to the ferrule and removes the dirt and grease due to the pressure it maintains on the sides of the ferrule as it is removed; therefore, it is very rarely necessary to use cleaning fluids. However, cleaning fluids such as isopropyl alcohol ("IPA") can be used in extreme conditions. Also, there is a distinct environmental advantage in that the rod 108 can be cleaned with IPA after use and can be reused many times before being discarded. Further, the rod material is very absorbent and will remove small dust and dirt particles and grease without redepositing them elsewhere on the ferrule 104 or fiber 103.

FIG. 2 illustrates an alternative embodiment wherein the rod 109 is now formed such that is has the hole 116 and its thin wall material 117 formed at one end. This hole 116 is similar to the holes 106 of the rod 108 of FIG. 1. However, besides the hole 116, the rod 109 of FIG. 2 also has a male protruding portion 110 formed at the opposite end of the rod 109. The rod 109 of this embodiment is intended to clean both the end face of a female-type ferrule 114 and the end face of an optical fiber 111 located within the ferrule 114. In this female-type ferrule 114, the ferrule is set back in a recess 112 from the far end edges of the fiber optic connector adaptor 115. Thus, the rod 109 may also clean the inside surfaces of the connector adaptor 115 as well.

Other than the male end 110, the rod 109 of this alternative embodiment is similar in composition to the rod 108 of FIG. 1. The male end 110 of the rod 109 is intended to be a snug fit within the recess 112. A shoulder or a taper may be formed in the rod 109 to provide a proper diameter size to accommodate the hole 116 at the other end of the rod 109. If formed, the shoulder may abut against the outer edge of the connector adaptor 115 when the male end 110 of the rod 109 is inserted in the recess 112.

Referring now to FIG. 3, there illustrated is an alternative embodiment of a rod 118, which is similar to the rod 108 of FIG. 1 in that is has a pair of holes 122,123 formed at the ends of the rod 124. However, the rod 124 of FIG. 3 has a cleaning and/or polishing insert 119 formed integral with the rod 118 during manufacture by, for example, heat setting or gluing the insert 119 into the rod 118. In this case, the rod 118 may comprise a flexible, plastic or UHMWPE absorbent tubing with a continuous bore formed therethrough. The insert 119 results in a pair of end faces or working surfaces 120,121, which physically contact, for cleaning and polishing, both the end face of the ferrule 104 (FIG. 1) and the end face of the optical fiber 103. These working surfaces 120,121 may be smooth or grooved, and they may be planar or curved. A grooved working surface 120,121 is used to catch and hold particles that are polished off of the end face of the ferrule 104 and fiber 103. The insert 119 may be of a material such as aluminum oxide, diamond, or titanium, which is abrasive and serves to both clean an polish both the end face of the male-type ferrule 104 and the end face of the optical fiber 103. Similar to the rods 108 and 109 of FIGS. 1 and 2, respectively, the rod 118 is also preferably porous and absorbent, so that is can also clean the sides of the ferrule 104, and it also removes an particulate matter that results from the polishing operation.

Figure 4:
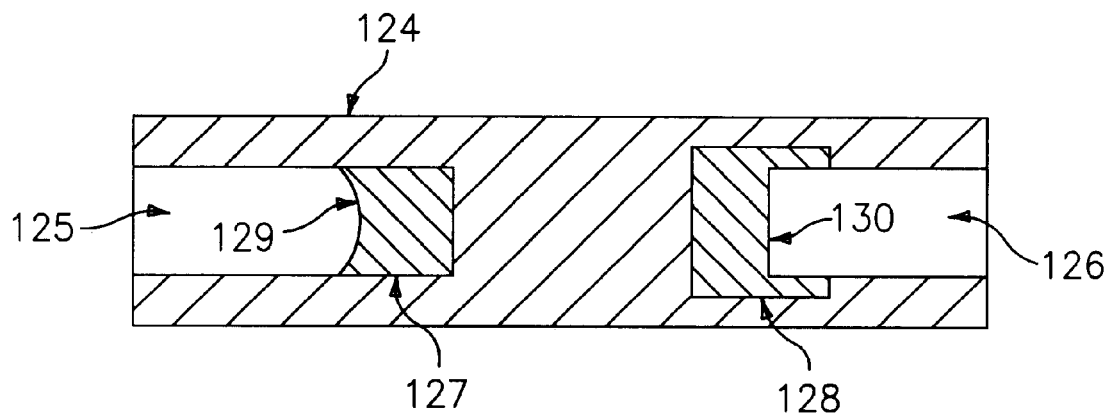
FIG. 4 is a cross-sectional view of another alternative embodiment of the rod of FIG. 1.

Referring now to FIG. 4, there illustrated is yet another embodiment of the rod 124 having a pair of holes 125,126 similar to the rod 108 of FIG. 1. Contrary to the hollow tubular rod 118 and insert 119 configuration of FIG. 3, the rod 124 of FIG. 4 is formed from a solid piece of material. The rod 124 has a pair of holes 125,126 formed at the ends. Corresponding inserts 127,128 are placed into the holes. These inserts 127,128 result in working surfaces 129,130 that contact the end faces of the male-type ferrule 104 (FIG. 1) and optical fiber 103 (FIG. 1) for cleaning and/or polishing. The working surface 129 of lie insert 127 has a concave curve preferably of a radius larger than the corresponding radius of the convex curve of the end face of a typical ferrule 104. This is so the working surface 129 does not cut into the end face of the ferrule 104 during polishing.

In contrast, the working surface 130 of the insert 128 may extend around to a portion of the sides of the hole 126. This way, cleaning and/or polishing of not only the end face of the ferrule but also a portion of the side of the male-type ferrule 104 (FIG. 1) may be accomplished. The remaining portion of the side of the ferrule 104 not polished by the insert 128 may be cleaned by the remaining surface of rod material defining the hole 126.

Various different features of cleaning and/or polishing rods have been described herein. However, it is to be understood that these features are interchangeable among each other, and do not have to be necessarily used in the configurations and combinations ascribed and illustrated herein. For example, the rod 109 of FIG. 2 does not necessarily have to have a hole 116 formed at one end. Also, the rod 109 of FIG. 2 may have a polishing insert or material formed at the end that contacts the end face of the ferrule and optical fiber. The broadest scope of the present invention contemplates various configurations and combinations for the rod.

Also, it should be understood that the rod of the present invention may be utilized to clean and/or polish an end face of an optical fiber regardless of whether it is encased within a ferrule; essentially, regardless of the configuration of a device used to hold an optical fiber.

It should be understood by those skilled in the art that obvious structural modifications may be made to the rod, in light of the teachings herein, without departing from the broadest scope of the invention.

Having thus described the invention, what is claimed is:

1. In a fiber optic connector of the type having a ferrule mounted within a connector adapter housing, wherein the ferrule has a free end portion, with an end face, that protrudes beyond an adjacent protruding end portion of the adapter housing and there is an annular crevice between an outer surface of the protruding end portion of the ferrule and an inner surface of the protruding end portion of the adapter housing, the combination with a device for simultaneously cleaning substantially the entire outer surface of the protruding end portion of the ferrule and an end face of an optical fiber contained within the ferrule, the device comprising a rod having at least one opening formed in an end portion of the device, the opening having a predetermined size and shape that approximately corresponds to the size and shape of the ferrule, the opening having a predetermined depth that approximately corresponds to the depth of the crevice such that when the rod opening is placed over the ferrule a sidewall of the rod at the opening extends down the entire length of the protruding end portion of the ferrule down to a bottom of the crevice, the opening terminating in an end face working surface that is operable to physically contact an end face of the ferrule and the end face of the optical fiber, said working surface being fixed with respect to said rod, the working surface comprising means for cleaning the end face of the optical fiber and substantially the entire protruding end portion of the ferrule, including the end face of the ferrule.

2. The device of claim 1, wherein the rod comprises a porous material.

3. The device of claim 1, wherein the rod comprises an absorbent material.

4. The device of claim 1, wherein the rod comprises an ultra high molecular weight polyethylene ("UHMWPE") hydrophobic material.

5. The device of claim 1, wherein the rod further includes a male protrusion formed at an end of the rod, the male protrusion comprising means for cleaning the end face of the optical fiber.

6. The device of claim 5, wherein the rod further comprises means for polishing the end face of the optical fiber.

7. The device of claim 1, wherein the rod further includes a male protrusion formed at an end of the rod, the male protrusion comprising means for polishing the end face of the ferrule.

8. The device of claim 1, wherein the rod comprises a hollow outer tubular member with a central opening, the rod further comprises an insert located within a portion of the central opening.

9. In a fiber optic connector of the type having a ferrule mounted within a connector adapter housing, wherein the ferrule has a protruding free end portion and an end face, and there is an annular crevice between an outer surface of the protruding end portion of the ferrule and an inner surface of the protruding end portion of the adapter housing, the combination with a device for simultaneously cleaning, degreasing, and polishing the end face of the ferrule and an end face of an optical fiber contained within the ferrule, the device comprising a rod having at least one opening formed in an end portion of the device, the opening having a predetermined size and shape that approximately corresponds to the size and shape of the ferrule, the opening having a predetermined depth that approximately corresponds to the depth of the crevice such that when the rod opening is placed over the ferrule a sidewall of the rod at the opening extends down the entire length of the protruding end portion of the ferrule down to a bottom of the crevice, wherein the rod further includes an insert located within the opening, the insert having a working surface, said working surface being fixed with respect to said rod, the insert adaptable to be placed into physical contact with both the end face of the ferrule and the end face of the optical fiber, the insert working surface comprising cleaning, degreasing, and polishing means for cleaning, degreasing, and polishing both the end face of the ferrule and the end face of the optical fiber.

10. The device of claim 9, wherein the insert working surface is adaptable to be placed into physical contact with a side portion of the ferrule, the insert working surface further comprising polishing means for polishing the side portion of the ferrule.

11. In a fiber optic connector of the type having an end portion of an outer connector adapter protruding beyond an adjacent end face of a ferrule mounted within the adapter, wherein an end face of the ferrule, which contains an exposed end face of an optical fiber housed within the ferrule, is located within a recess formed in the adapter adjacent the protruding end portion of the adapter, the combination with an elongated rod for simultaneously cleaning substantially the entire recess and the end face of the optical fiber, the rod comprising a porous and absorbent material, the rod having a male protrusion at one end with a size that approximately corresponds to the size and shape of the recess, the rod having a working surface at an end of the male protrusion, the working surface being fixed with respect to said rod, the working surface comprising means for cleaning the end face of the optical fiber when the rod is in contact with the end face of the optical fiber.

12. The rod of claim 11, wherein the working surface of the rod comprises means for polishing the end face of the optical fiber when the rod is in contact with the end face of the optical fiber.

13. The rod of claim 11, wherein the rod comprises an ultra high molecular weight polyethylene ("UIHMWPE") hydrophobic material.

14. In a fiber optic connector of the type having a ferrule mounted in a connector adapter housing, wherein the ferrule has a protruding free end portion with an outer surface section and an adjacent end face, the combination with a device for simultaneously cleaning, degreasing, and polishing the outer surface section of the protruding end portion of the ferrule, the end face of the ferrule, and an exposed end face of an optical fiber contained within the ferrule, the device comprising a rod having at least one recess formed in an end portion of the device, the recess having a predetermined opening that approximately corresponds to the size and shape of the ferrule, the recess having a predetermined depth that corresponds to at least part of the length of the protruding end portion of the ferrule such that, when the recess is slid over the protruding ferrule's end face and down the ferrule's outer surface section, the recess has inner working surfaces that are operable to simultaneously contact the outer surface section of the protruding ferrule, the end face of the protruding ferrule, and the end face of the optical fiber, wherein the working surfaces comprise means for cleaning, degreasing, and polishing the outer surface portion of the protruding end portion of the ferrule, the end face of the ferrule, and the exposed end face of the optical fiber, and wherein the working surfaces comprise an ultra high molecular weight polyethylene ("UHMWPE") hydrophobic material, said surfaces being fixed with respect to said rod.

15. A method of cleaning and polishing a fiber optic cable of the type having an optical fiber contained within a ferrule, wherein the ferrule has a free end with an exposed end face of the fiber, the method comprising the steps of: providing a rod, with a recessed end, made of an ultra high molecular weight polyethylene ("UHMWPE") hydrophobic material; inserting the recessed end of the rod over the free end of the ferrule; sliding the recessed end down over the ferrule toward another end of the ferrule, until an end wall, fixed with respect to said rod, within the recessed end abuts the end faces of the ferrule and fiber; and rotating the rod to polish, degrease and otherwise clean the end faces of the ferrule and fiber with the UHMWPE material within the recessed end.

* * * * *